(12) United States Patent
Krampotich et al.

(10) Patent No.: US 8,526,774 B2
(45) Date of Patent: Sep. 3, 2013

(54) TELECOMMUNICATIONS PANEL AND DRAWER ARRANGEMENT

(75) Inventors: Dennis Krampotich, Shakopee, MN (US); Ryan Kostecka, Burnsville, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 454 days.

(21) Appl. No.: 12/586,285

(22) Filed: Sep. 18, 2009

(65) Prior Publication Data

US 2010/0086275 A1    Apr. 8, 2010

Related U.S. Application Data

(60) Provisional application No. 61/194,085, filed on Sep. 23, 2008.

(51) Int. Cl.
*G02B 6/00* (2006.01)
(52) U.S. Cl.
USPC .......................................................... 385/135
(58) Field of Classification Search
USPC .......................................................... 385/135
See application file for complete search history.

(56) References Cited

U.S. PATENT DOCUMENTS

| | | | |
|---|---|---|---|
| 5,119,459 A * | 6/1992 | Meyerhoefer et al. | 385/135 |
| 5,490,229 A | 2/1996 | Ghandeharizadeh et al. | |
| 6,504,988 B1 | 1/2003 | Trebesch et al. | |
| 7,397,996 B2 | 7/2008 | Herzog et al. | |
| 7,570,861 B2 | 8/2009 | Smrha et al. | |
| 2004/0251220 A1 | 12/2004 | Mertesdorf et al. | |
| 2005/0111809 A1* | 5/2005 | Giraud et al. | 385/135 |
| 2008/0050083 A1* | 2/2008 | Frazier et al. | 385/135 |
| 2008/0175550 A1 | 7/2008 | Coburn et al. | |
| 2009/0245746 A1 | 10/2009 | Krampotich et al. | |

FOREIGN PATENT DOCUMENTS

WO    WO 2009/138029 A1    11/2009

* cited by examiner

*Primary Examiner* — Uyen Chau N Le
*Assistant Examiner* — Hoang Tran
(74) *Attorney, Agent, or Firm* — Merchant & Gould P.C.

(57) ABSTRACT

A cable management and termination arrangement constructed for use in both a sliding drawer application and a hinged panel application. The cable management and termination arrangement including a sliding drawer and first and second hinged access panels. In a sliding drawer application, the arrangement is horizontally mounted; the drawer slides between an open position and a closed position to provide access to the interior. In a hinged panel application, the arrangement is vertically mounted; the first and second hinged access panels pivot between open and closed positions to provide access to the interior.

18 Claims, 9 Drawing Sheets

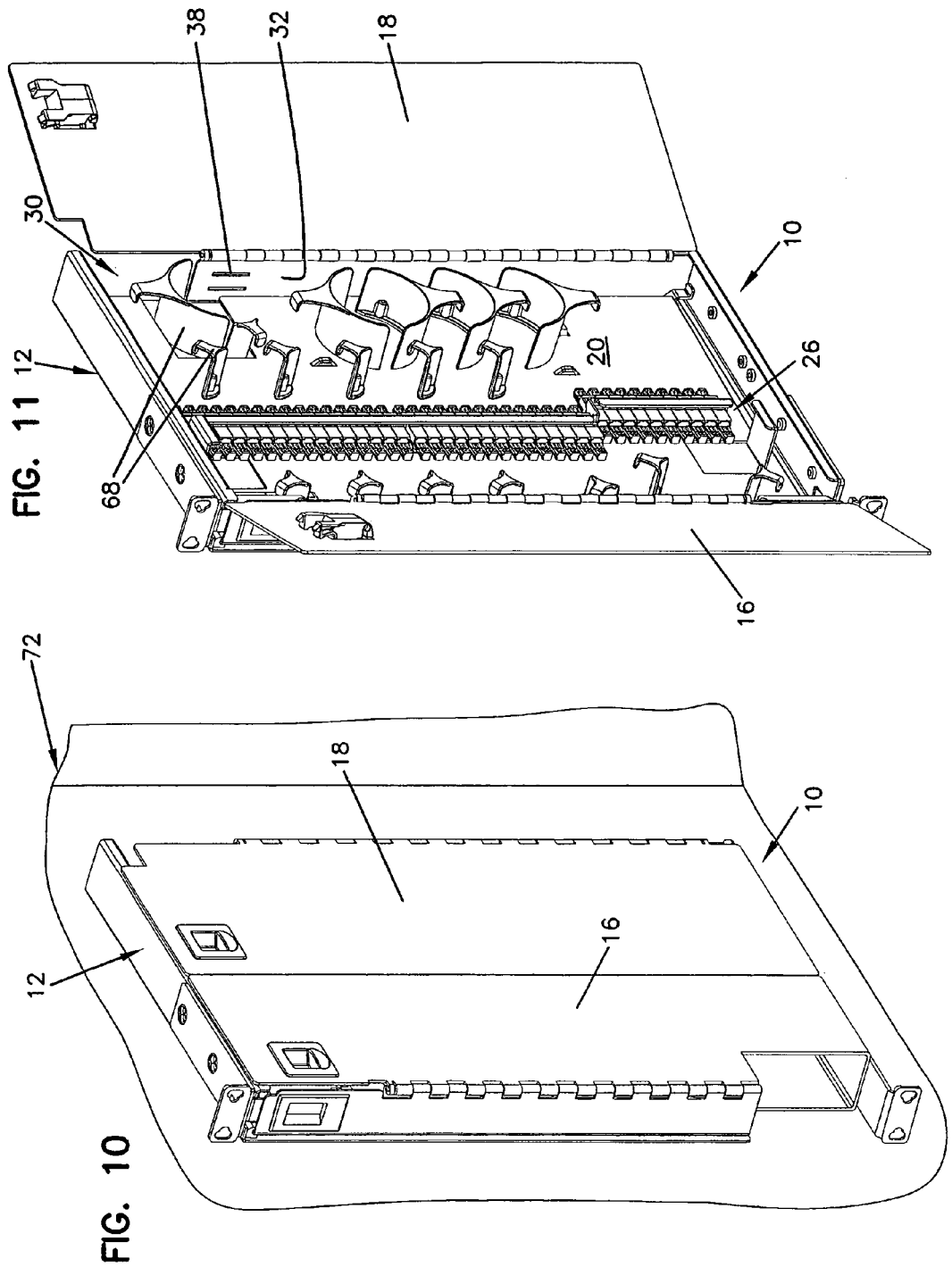

TELECOMMUNICATIONS PANEL AND DRAWER ARRANGEMENT

CROSS-REFERENCE TO RELATED APPLICATIONS

This application claims the benefit of U.S. Provisional Application Ser. No. 61/194,085, filed Sep. 23, 2008; which application is incorporated herein by reference.

FIELD OF THE TECHNOLOGY

The present disclosure relates generally to devices for use in the telecommunications industry, and various methods associated with such devices. More particularly, this disclosure relates to arrangements for managing cables and providing cable terminations, and various methods associated with such arrangements.

BACKGROUND

Telecommunications systems utilize fiber optic cables and/or copper cables to interconnect pieces of telecommunications equipment. Cable management structures that provide cable management and cable terminations associated with the system are commonly mounted to telecommunication racks, within cabinets, or to other framework structures. Adaptation is a factor in the effectiveness of the overall management of cables and cable terminations. In general, conventional arrangements for managing cables and cable terminations can be improved.

SUMMARY

One aspect of the present disclosure relates to a cable management and termination arrangement that can be used in both a sliding drawer application and a hinged panel application. In the sliding drawer application, the arrangement is horizontally mounted and includes a drawer that slides between an open position and a closed position to provide access to the internal cables and terminations. In the hinged panel application, the arrangement is vertically mounted and has first and second hinged doors that provide access to the internal cables and terminations.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

BRIEF DESCRIPTION OF THE DRAWINGS

FIG. 10 is a front perspective view of the cable termination arrangement of FIG. 1, the cable termination arrangement being oriented for use as a hinged panel;

FIG. 11 is a front perspective view of the cable termination arrangement of FIG. 10, the access panels of the cable termination arrangement being illustrated in open positions.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 12:
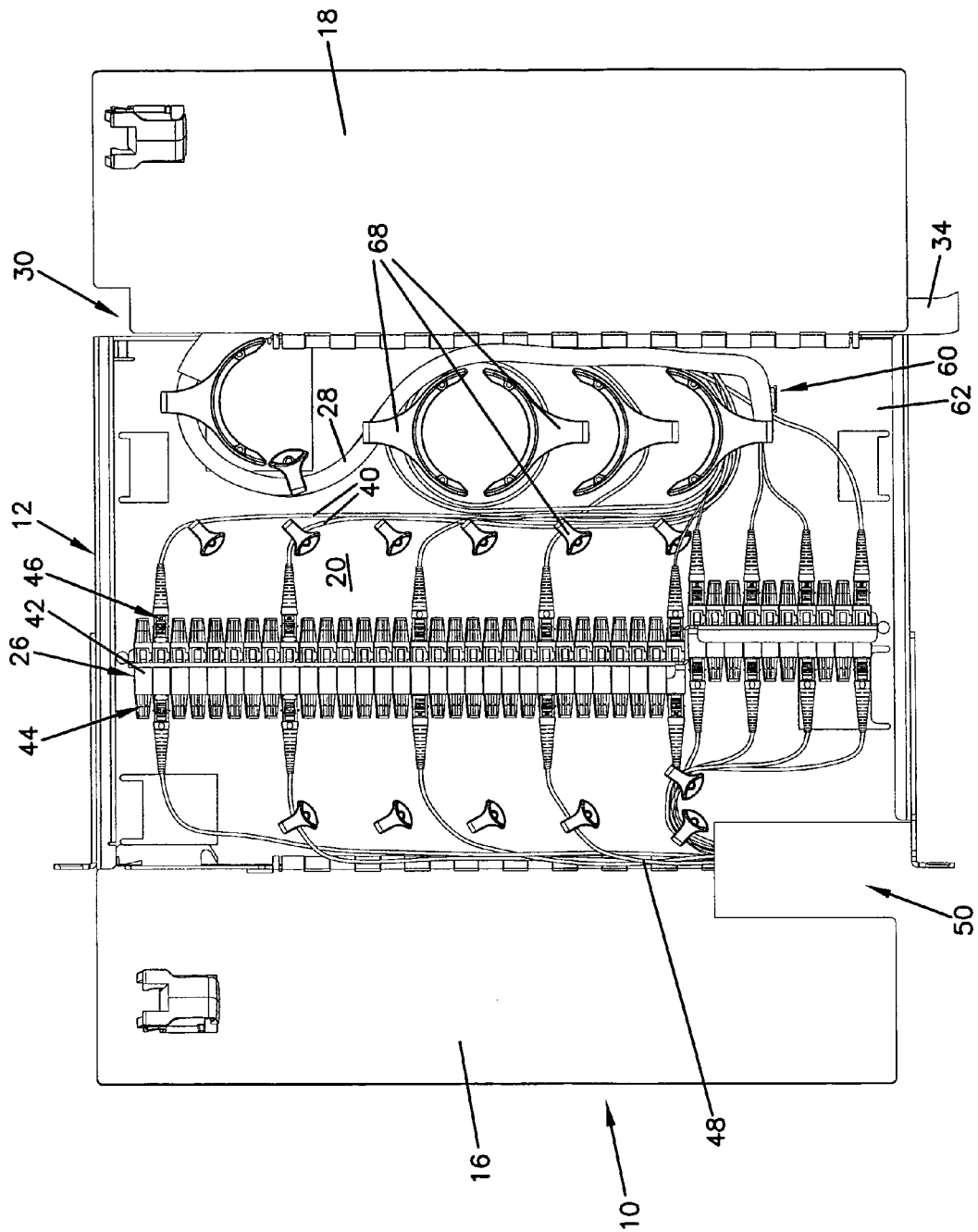
FIG. 12 is a front elevation view of the cable termination arrangement of FIG. 11.

The present disclosure relates to a cable termination arrangement 10 that can be used in both a sliding drawer application and a hinged panel application. FIGS. 1-9 illustrate the cable termination arrangement 10 being utilized as a sliding drawer; FIGS. 10-12 illustrate the cable termination arrangement 10 being utilized as a hinged panel. The present arrangement allows a technician the selectively choose or change the cabling configuration of a telecommunications system without having to invest costs into additional or different structure that houses the cables and cable terminations.

Figure 1:
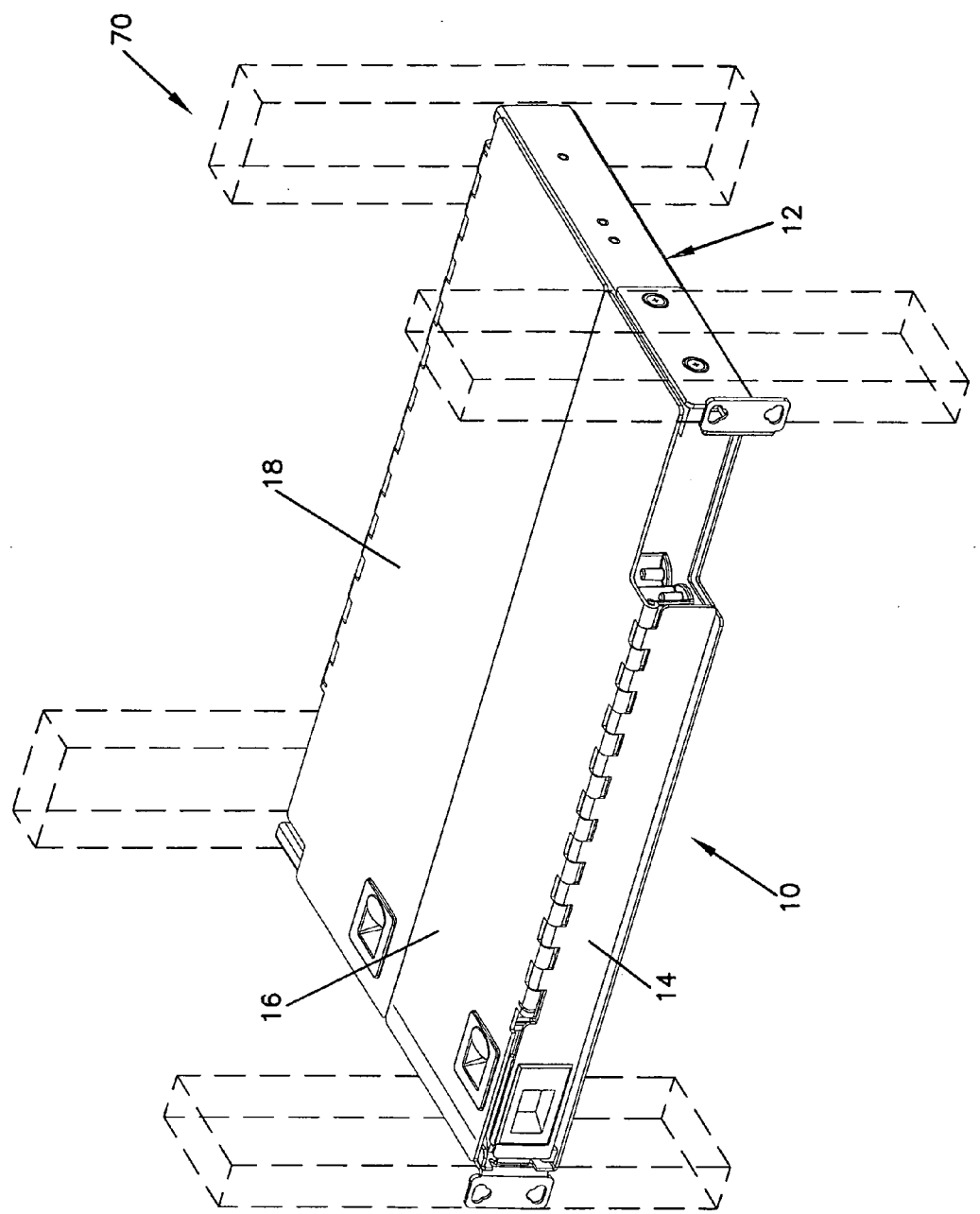
FIG. 1 is a front perspective view of a cable termination arrangement, in accordance with the principles disclosed, the cable termination arrangement being oriented for use as a sliding drawer.
Figure 2:
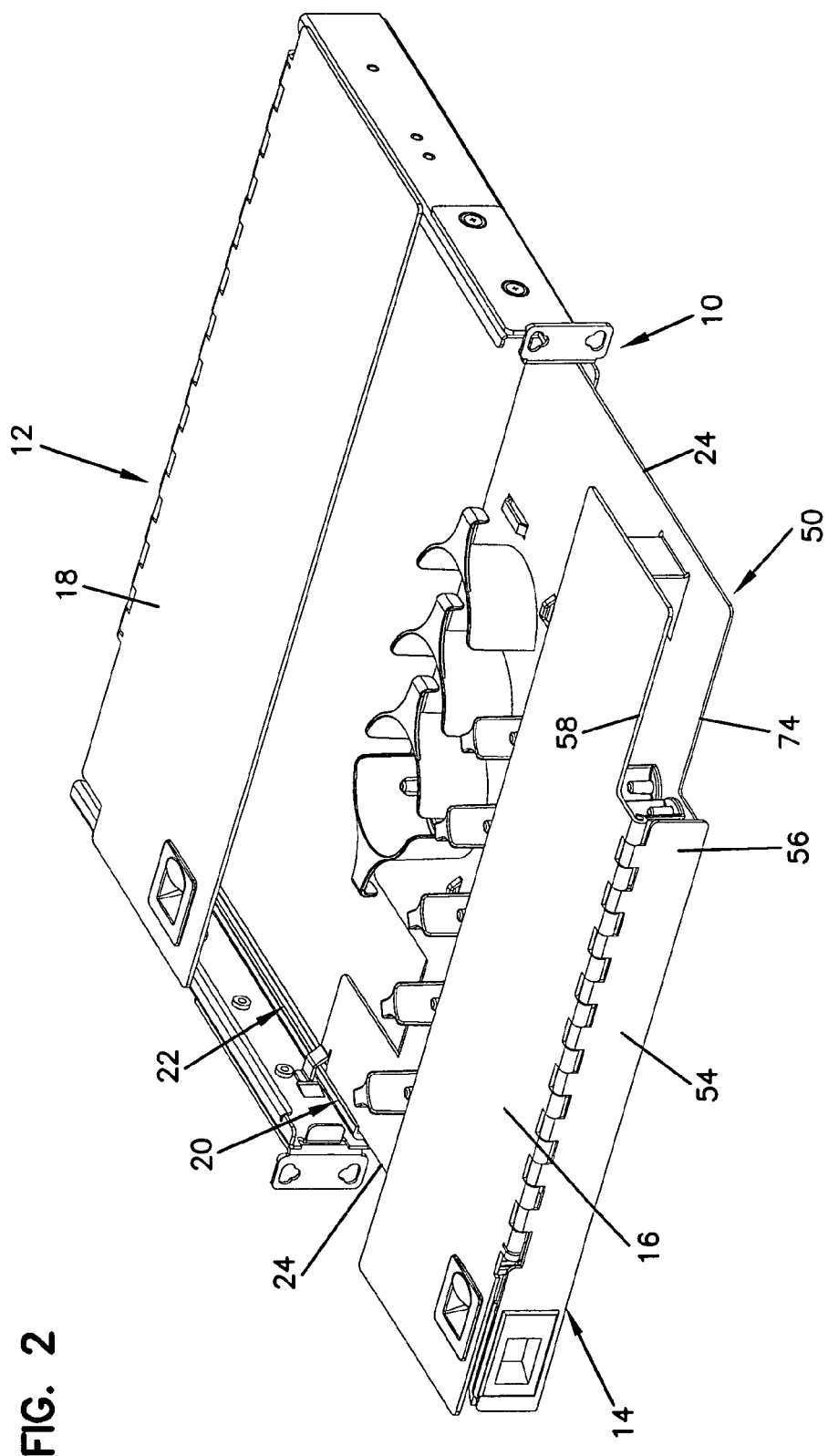
FIG. 2 is a front perspective view of the cable termination arrangement of FIG. 1, a drawer of the cable termination arrangement being illustrated in an open position.

Referring to FIG. 1, the arrangement 10 generally includes a chassis 12 and a drawer 14 that slides relative to the chassis 12. A first hinged access panel 16 is mounted to the drawer 14, and a second hinged access panel 18 is mounted to the chassis 12. The drawer 14 has an interior 20 (FIG. 2). In the illustrated embodiment, the interior 20 is generally defined by the perimeter of the drawer, as the drawer has open sides and an open rear. In the alternative, the drawer can include side walls and/or a rear wall that define the drawer interior. The chassis 12 and the first and second hinged access panels 16, 18 enclose and protect the contents within the interior 20 of the drawer 14.

When used as a sliding drawer, the arrangement 10 is horizontally mounted, for example, to a rack 70 (schematically illustrated in FIG. 1) or other framework. The chassis 12 includes slide structure 22 (e.g., channels; see FIGS. 2 and 7) that receives edges 24 of the drawer 14. The drawer 14 slides within the slide structure 22 between a closed position (FIG. 1) and an open position (FIG. 2) to provide access to the internal cables and terminations.

Figure 3:
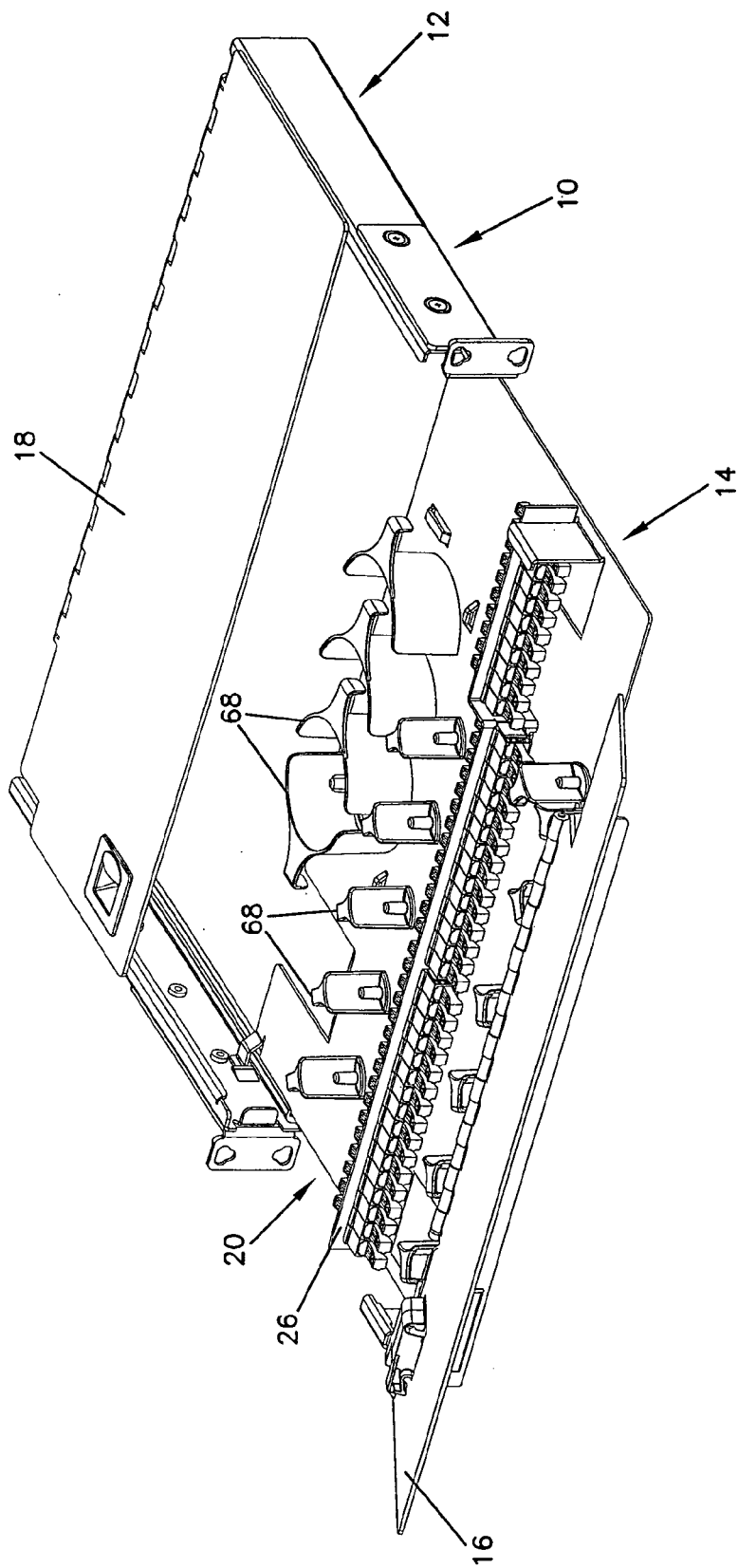
FIG. 3 is a front perspective view of the cable termination arrangement of FIG. 2, an access panel of the cable termination arrangement being illustrated in an open position.

To access the internal cables and terminations, the drawer 14 is first slid open and the first hinged access panel 16 is then pivoted from a closed position (FIG. 2) to an open position (FIG. 3). The second hinged access panel 18 functions as a top chassis wall. In the illustrated embodiment, cable terminations 26 (FIG. 3), such as fiber optic adapters, are located within the interior 20 of the drawer under the first hinged access panel 16. Other cable management components 68, such as cable radius limiters and cable guides, are located within the interior 20 of the drawer 14 rearward of the cable terminations 26, and are accessible when the drawer 14 is slid open. Examples of other terminations, cable management components, and/or distribution structures that can be provided within the drawer interior and/or chassis include attenuators, couplers, switches, wave divisions multiplexers, splitters, combiners, or splices.

Figure 4:
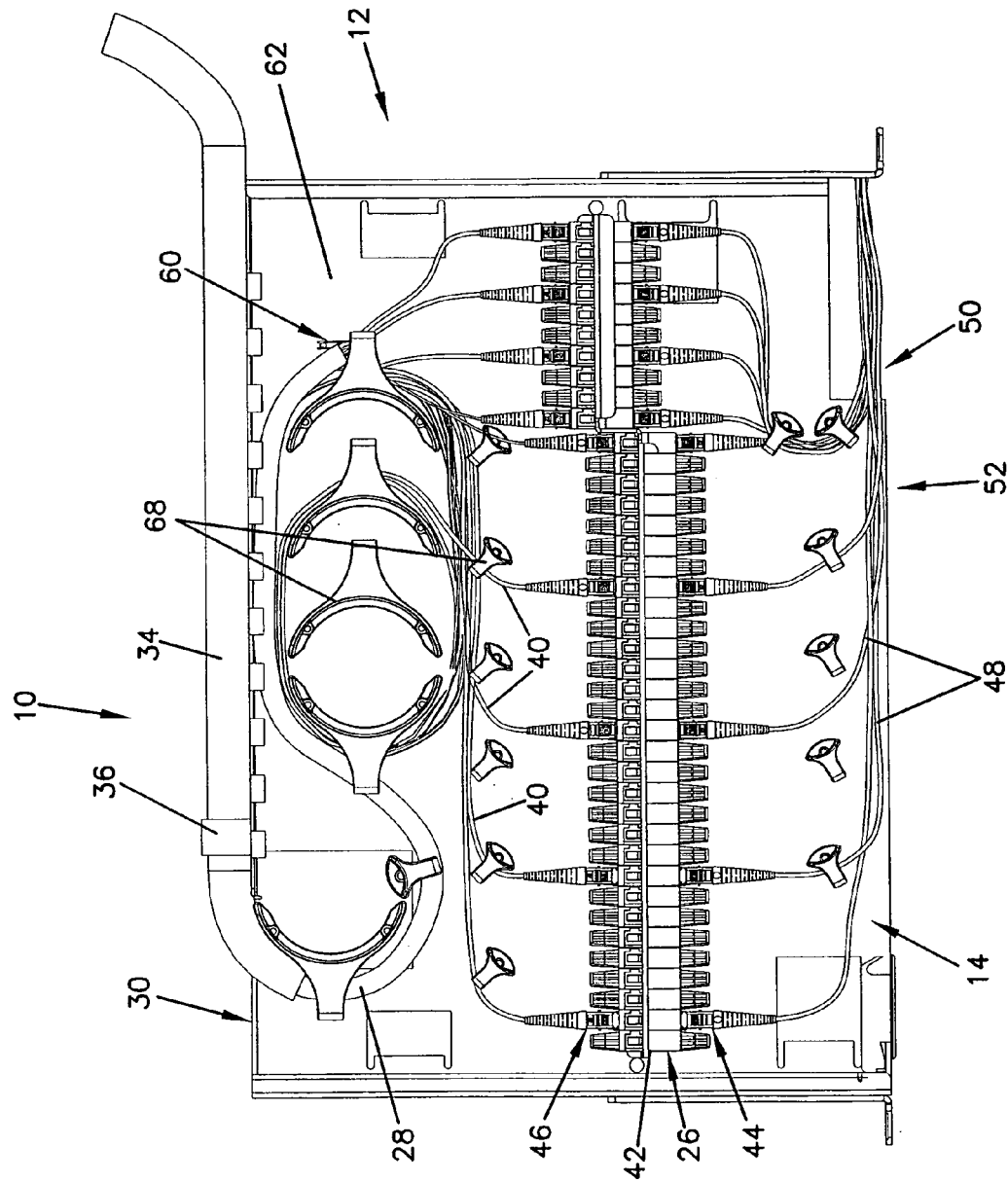
FIG. 4 is a top plan view of the cable termination arrangement of FIG. 1 illustrated without access panels to show the interior of the drawer.
Figure 5:
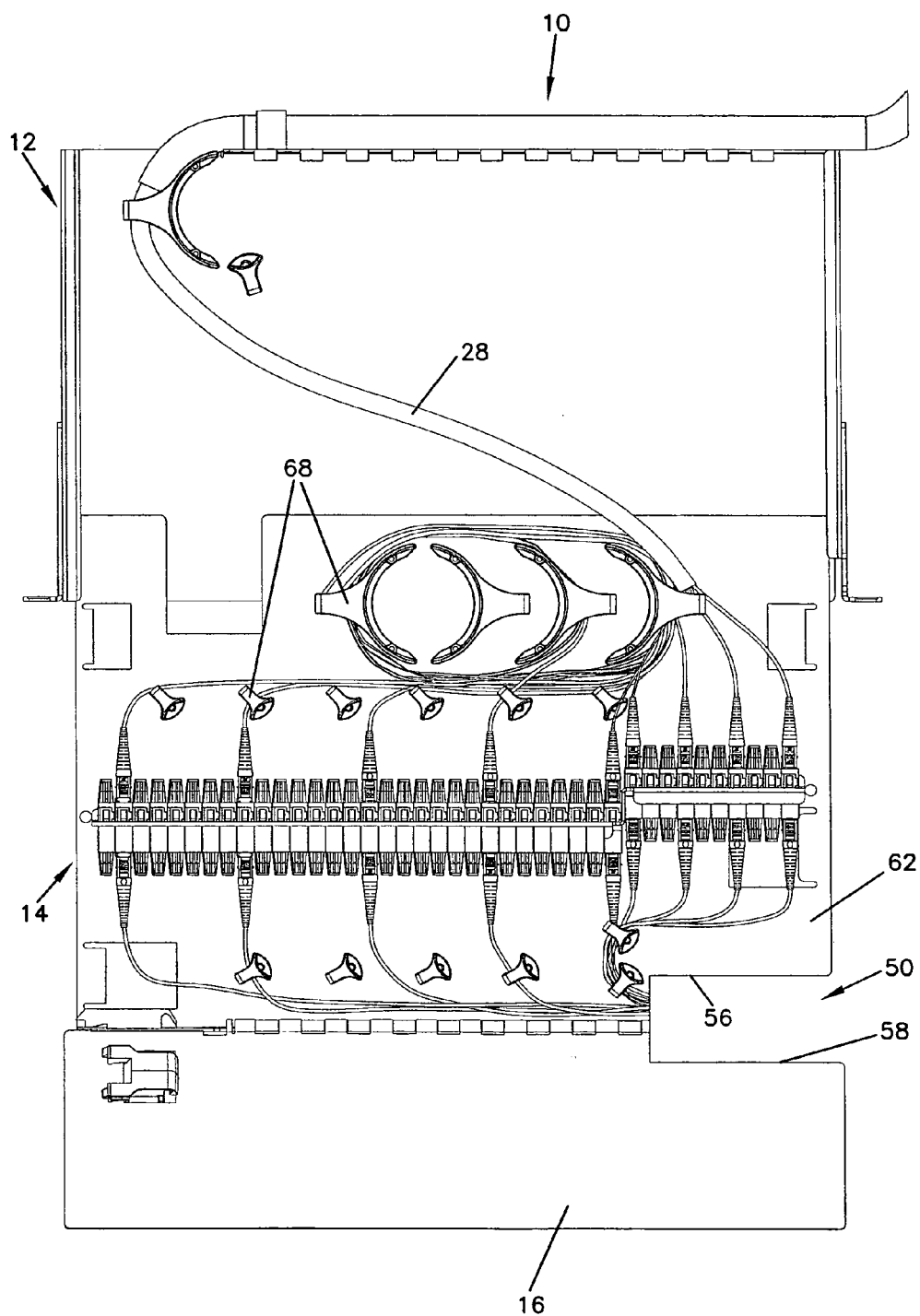
FIG. 5 is a top plan view of the cable termination arrangement of FIG. 3 illustrated without one of the access panels to show the interior of the drawer.
Figure 6:
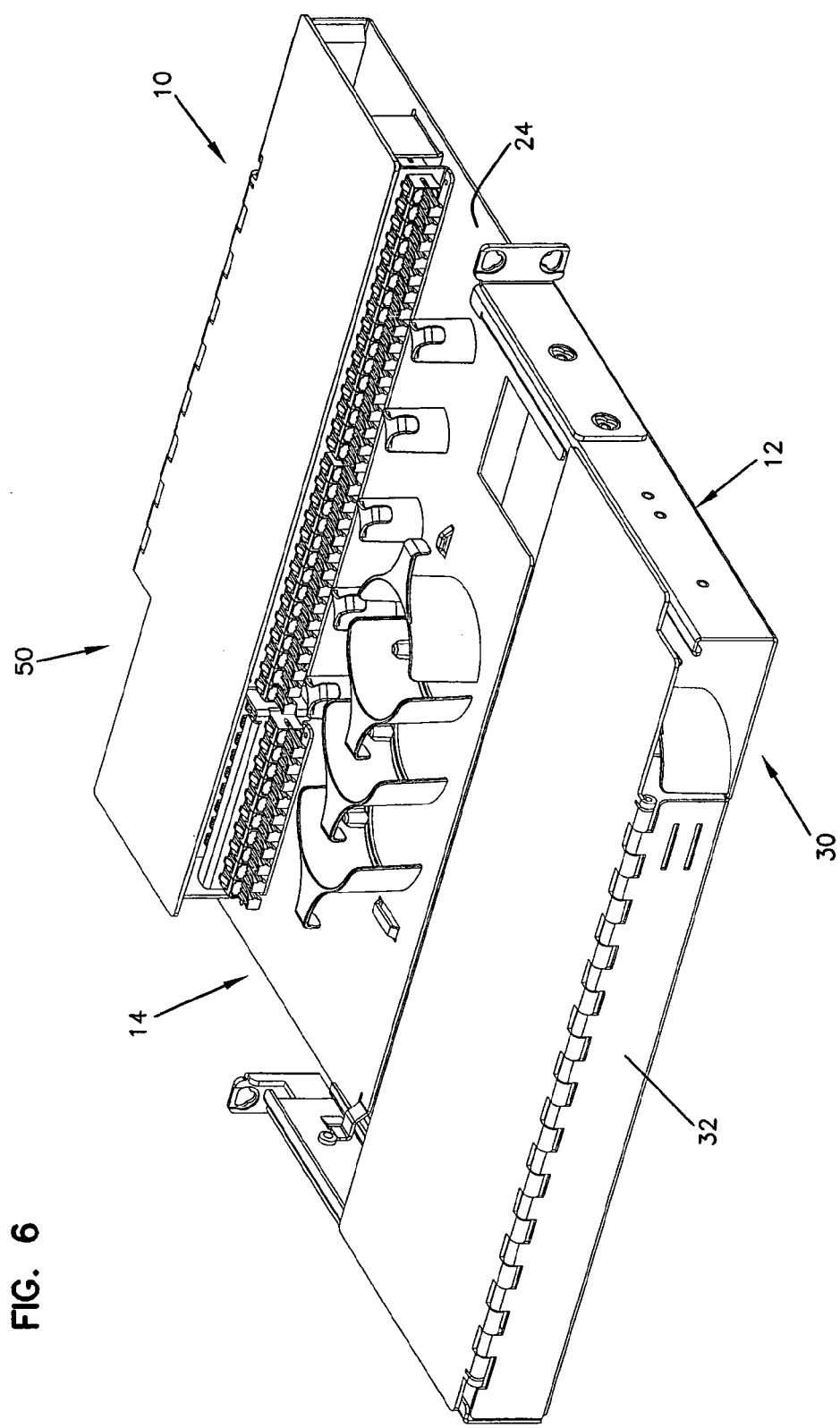
FIG. 6 is a rear perspective view of the cable termination arrangement of FIG. 2.
Figure 7:
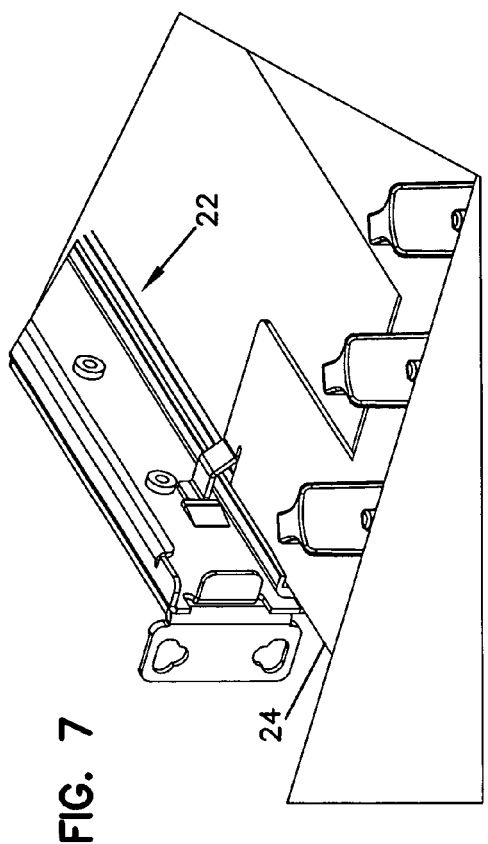
FIG. 7 is a front perspective view of a portion of the cable termination arrangement of FIG. 2.
Figure 9:
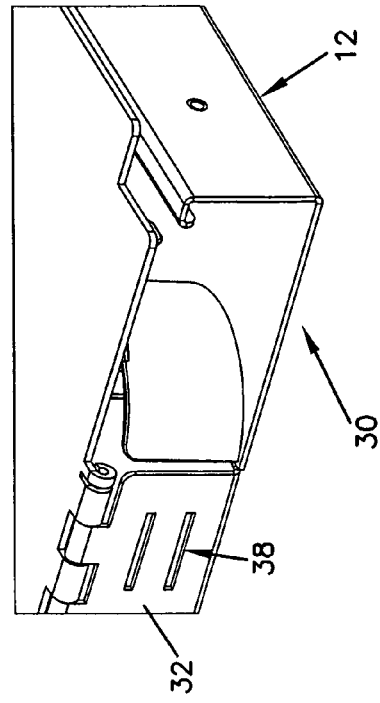
FIG. 9 is a rear perspective view of a portion of the cable termination arrangement of FIG. 6.
Figure 8:
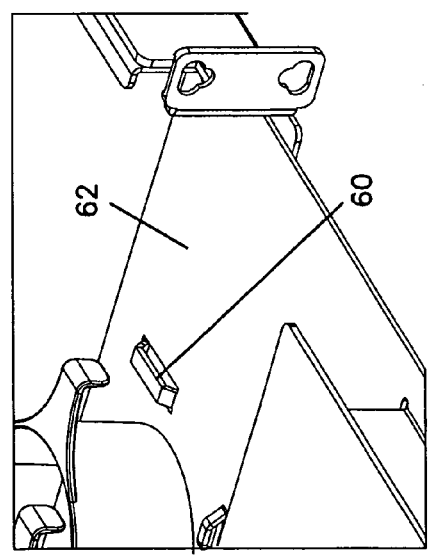
FIG. 8 is a front perspective view of another portion of the cable termination arrangement of FIG. 2.

Referring now to FIGS. 4 and 5, one cable routing arrangement of the horizontally-oriented cable termination arrangement 10 is illustrated. In FIG. 4, the first and second access panels 16, 18 are not illustrated for purpose of clarity. In this cable routing arrangement, a main distribution cable 28 enters the chassis 12 through a cable entry opening 30 (see also FIG. 9) located in a wall 32 of the chassis 12. In this particular orientation, the wall 32 is generally a rear wall of the chassis 12. The main distribution cable 28 is routed through a conduit tube 34 and secured to the wall 32 by a Velcro strip 36. The Velcro strip 36 is threaded through tie off structure 38 (FIG. 9) that is integrally formed in the wall 32.

From the opening 30, the main distribution cable 28 is routed around the cable management components 68. Additional tie off structure 60 (FIG. 8) is integrally formed in a wall 62 of the drawer 14. In this particular orientation, the wall 62 is generally a bottom wall of the drawer 14. Another Velcro strip (not shown) is threaded through the tie off structure 60 to secure the main distribution cable 28 relative to the drawer. A predetermined length of cable slack between the two securing points (e.g., 38, 60) is provided to accommodate the sliding movement of the drawer 14 from the closed position (FIG. 4) to the open position (FIG. 5).

Referring still to FIGS. 4 and 5, individual cable fibers 40 of the main distribution cable 28 are routed to the cable terminations 26 located forward of the cable management components 68. In the illustrated embodiment, the cable terminations 26 include adapters 42 having a front connection location 44 and a rear connection location 46. The individual cable fibers 40 from the main cable 28 terminate at the rear connection locations 46. Associated cables 48, such as patch cords, terminate at the front connection locations 44 of the adapters 42. The associated cables 48 exit the drawer 14 through a cable exit opening 50 located at a front 52 of the drawer 14. The cable exit opening 50 of the drawer 14 is defined by a notch 56 (FIG. 2) formed in a front wall 54 of the drawer, a notch 74 formed in the bottom wall 62 of the drawer, and a corresponding notch 58 formed in the first access panel 16 of the arrangement 10.

Referring now to FIGS. 10 and 11, the cable termination arrangement 10 is oriented for use as a hinged panel. The arrangement 10 can be, for example, mounted within the interior of a cabinet 72 (partially illustrated) and used for cable terminations and/or cable management within the cabinet. When used as a hinged panel, the arrangement 10 is vertically mounted, for example, to an interior wall or other support structure within the cabinet interior. The cable termination arrangement can also be vertically mounted to an exterior wall or other framework structure.

To access the interior 20 of the arrangement 10, the first and second hinged access panels 16, 18 (e.g., doors) are pivoted from the closed position (FIG. 10) to the open position (FIG. 11). In the illustrated embodiment, the cable terminations 26 are located within the interior 20 of the drawer 14 behind the first hinged access panel 16, while the cable management components 68 are located within the interior 20 behind the second hinged access panel 18.

Referring now to FIG. 12, one cable routing arrangement of the vertically-oriented cable termination arrangement 10 is illustrated. In this cable routing arrangement, the main distribution cable 28 enters the chassis 12 through the cable entry opening 30 (see also FIG. 11) located in the wall 32 of the chassis 12. In this particular orientation, the wall 32 is generally a side wall of the chassis 12. The main distribution cable 28 is routed through the conduit tube 34 and secured to the wall 32 by the Velcro strip (see e.g., FIG. 4). The Velcro strip is threaded through the tie off structure 38 (FIG. 11) that is integrally formed in the wall 32.

From the opening 30, the main distribution cable 28 is routed around the cable management components 68. Additional tie off structure 60 (see also FIG. 8) is integrally formed in the wall 62. Another Velcro strip (not shown) is threaded through the tie off structure 60 to secure the main distribution cable 28 within the interior (i.e., 20).

Referring still to FIG. 12, the individual cable fibers 40 of the main distribution cable 28 are routed to the cable terminations 26. As previously described, the cable terminations 26 include the adapters 42 having the two connection locations, for example, the now leftward facing connection locations 44 and the now rightward facing connection locations 46. The individual cable fibers 40 from the main cable 28 terminate at the rightward facing connection locations 46. Associated cables 48, such as patch cords, terminate at the leftward facing connection locations 44 of the adapters 42. The associated cables 48 exit the drawer 14 through the cable exit opening 50 of the arrangement 10.

The above specification provides a complete description of the present invention. Since many embodiments of the invention can be made without departing from the spirit and scope of the invention, certain aspects of the invention reside in the claims hereinafter appended.

What is claimed is:

1. A cable termination arrangement, comprising:
  a) a chassis defining a cable entry opening and a cable exit opening, the chassis including a first side, a second side opposite the first side, and a top wall;
  b) a drawer that slides out from the first side of the chassis between an open position and a closed position, the drawer defining a drawer interior;
  c) cable terminations mounted to the drawer; and
  d) a first hinged panel mounted to the drawer and a second hinged panel mounted to the second side of the chassis and on an opposite side of the first hinged panel, wherein the first hinged panel and the second hinged panel are configured together to form the top wall of the chassis;
  e) wherein the arrangement is constructed to mount in a generally horizontal orientation, access to the cable terminations being provided by sliding the drawer to an open position and pivoting only the first hinged panel to an open position; and
  f) wherein the arrangement is constructed to mount in a generally vertical orientation, access to the cable terminations being provided by pivoting both the first and second hinged panels to open positions.

2. The cable termination arrangement of claim 1, wherein when mounted in the generally horizontal orientation, the cable entry opening is located in a rear wall of the chassis.

3. The cable termination arrangement of claim 2, further including a main distribution cable that is routed through the cable entry opening.

4. The cable termination arrangement of claim 3, wherein the main distribution cable is routed through a conduit tube secured to the rear wall of the chassis.

5. The cable termination arrangement of claim 3, wherein individual cable fibers of the main distribution cable are terminated at rear connection locations of the cable terminations, and wherein associated cables terminated at front connection locations of the cable terminations are routed through the cable exit opening.

6. The cable termination arrangement of claim 5, wherein the cable exit opening is at least partly defined by a front wall of the chassis.

7. The cable termination arrangement of claim 6, wherein the cable exit opening is defined by a notch formed in the front wall of the chassis, a notch formed in a bottom wall of the drawer, and a notch formed in the first hinged panel.

8. The cable termination arrangement of claim 1, wherein when mounted in the generally vertical orientation, the cable entry opening is located in a first side wall of the chassis.

9. The cable termination arrangement of claim 8, further including a main distribution cable that is routed through the cable entry opening.

10. The cable termination arrangement of claim 9, wherein the main distribution cable is routed through a conduit tube secured to the first side wall of the chassis.

11. The cable termination arrangement of claim 9, wherein individual cable fibers of the main distribution cable are terminated at first connection locations of the cable terminations, and wherein associated cables terminated at opposing second connection locations of the cable terminations are routed through the cable exit opening.

12. The cable termination arrangement of claim 11, wherein the cable exit opening is at least partly defined by a second opposite side wall of the chassis.

13. The cable termination arrangement of claim 12, wherein the cable exit opening is at least partly defined by a notch formed in the second opposite side wall of the chassis, a notch formed in the drawer, and a notch formed in the first hinged panel.

14. A method of assembling a cable termination arrangement, the method comprising the steps of:
   a) providing a chassis and a drawer that slides relative to the chassis between an open position and a closed position, the chassis including a first side, a second side opposite the first side, and a top wall, and the drawer defining a mounting location for cable terminations; and
   b) mounting a first hinged panel to the drawer, and mounting a second hinged panel to the second side of the chassis and on an opposite side of the first hinged panel, the first hinged panel and the second hinged panel are configured together to form the top wall of the chassis;
   c) wherein the arrangement is constructed to mount in a generally horizontal orientation, access to the drawer interior being provided by sliding the drawer out from the first side of the chassis to an open position and pivoting only the first hinged panel to an open position; and
   f) wherein the arrangement is constructed to mount in a generally vertical orientation, access to the drawer interior being provided by pivoting both the first and second hinged panels to open positions.

15. The method of claim 14, further including routing a main distribution cable through a cable entry opening, the cable entry opening being located in a rear wall of the chassis when the arrangement is mounted in the generally horizontal orientation, the cable entry opening being located in a side wall of the chassis when the arrangement is mounted in the generally vertical orientation.

16. The method of claim 15, further including routing the main distribution cable through a conduit tube secured to the wall of the chassis in which the cable entry opening is located.

17. The method of claim 15, further including terminating individual cable fibers of the main distribution cable at first connection locations of cable terminations located within the drawer interior, and routing associated cables terminated at opposing second connection locations of the cable terminations through a cable exit opening of the chassis.

18. The method of claim 17, wherein the cable exit opening is at least partly defined by a front wall of the chassis when the arrangement is mounted in the generally horizontal orientation, and wherein the cable exit opening is at least partly defined by an opposite side wall of the chassis when the arrangement is mounted in the generally vertical orientation.

* * * * *